Inventor
Robert T. Doughty
By Willits, Helmig & Baillio
Attorneys

Patented Dec. 1, 1953

2,660,987

UNITED STATES PATENT OFFICE 2,660,987

INTERNAL-COMBUSTION ENGINE
VENTILATING SYSTEM

Robert T. Doughty, Detroit, Mich., assignor to General Motors Corporation, Detroit, Mich., a corporation of Delaware Application January 24, 1951, Serial No. 207,601

9 Claims. (Cl. 123—41.86)

1

This invention relates to ventilation of internal combustion engines and the like and particularly to means for mounting and driving a ventilating fan therein.

It is conventional practice to provide for ventilating internal combustion engines by arranging inlet and outlet openings to the crankcase and other internal compartments at points which will enable the natural drafts obtained in operation to expel unwanted accumulated gases. Where the engine is used to drive a vehicle additional draft for ventilation purposes is obtained by arranging the ventilating outlet in the slip stream of the vehicle whereby a certain amount of suction is obtained to increase the rate of air circulation through the engine. In modern day engines however where it is desired to have a rather tortuous ventilating circuit which will insure adequate ventilation of other compartments in addition to the crankcase and which will be effective when the vehicle is standing still with the engine idling, such natural draft means has been found inadequate. To meet this difficulty various proposals have been made toward providing a positive means for circulating the air through the engine but these have not met with commercial success principally due to the added cost entailed or lack of effectiveness.

A principal object of the instant invention is therefore to provide an improved mounting and driving means for a ventilating fan for use in internal combustion engines and the like.

It is a further object of my invention to provide an improved ventilating system for internal combustion engines including a positive axial flow fan mounted on a camshaft driven auxiliary drive and effective to transfer ventilating gases from the crankcase to the valve compartment.

Reference is now made to the drawings showing a preferred embodiment of the invention as applied to the ventilating system of an automotive vehicle internal combustion engine having an ignition distributor and oil pump drive geared in-line with each other to the engine camshaft, my ventilating fan being mounted coaxial with this drive and keyed for rotation therewith by means of tab-like lugs interfitting between the tongued and grooved ends of the distributor drive coupling. It will be understood, of course, that my invention in its broader aspects will have application to other types of engines and that my fan mounting and driving arrangement may be applied in similar manner to tongued and grooved shaft couplings generally.

Figure 1:
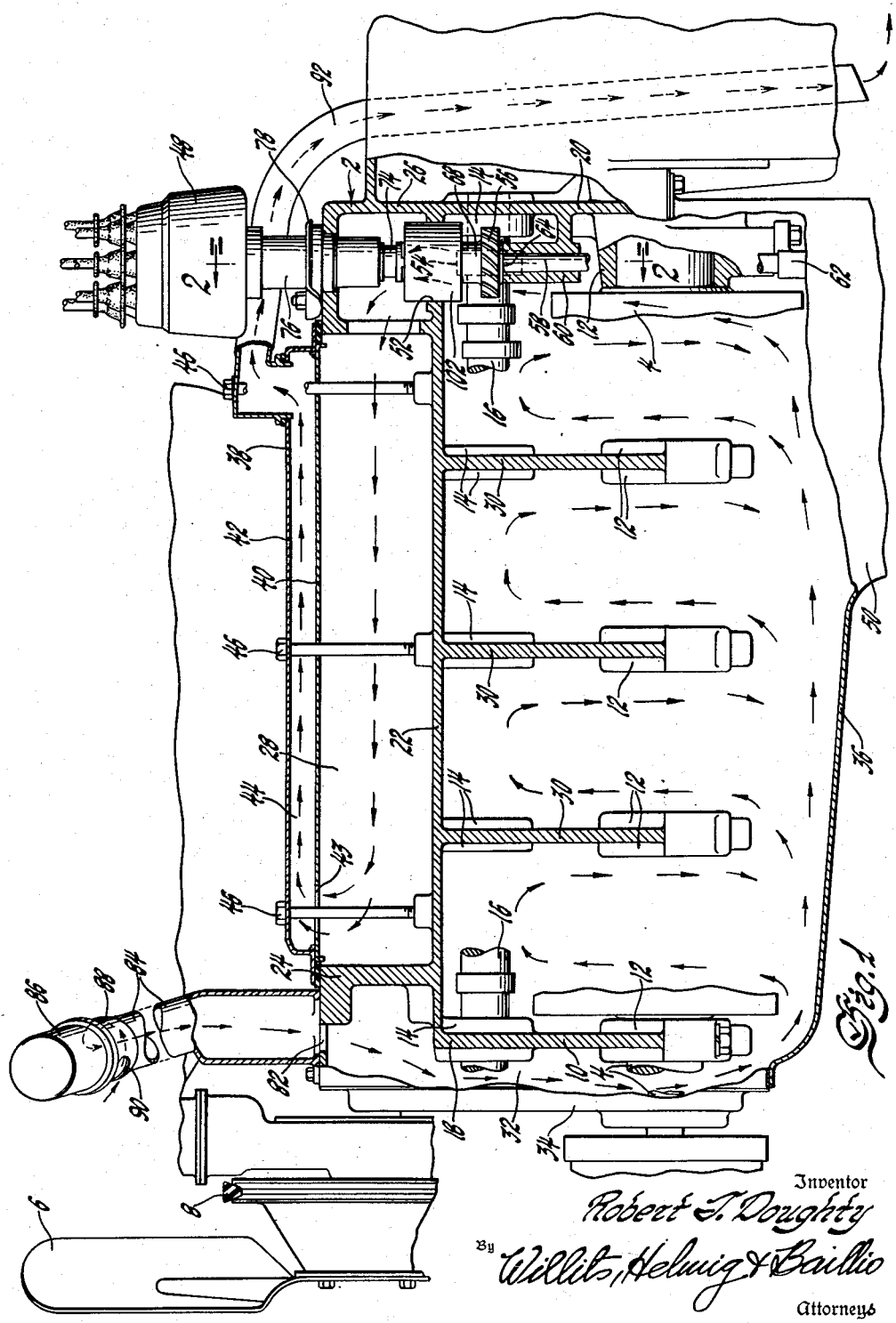
Figure 1 is a longitudinal elevational view of an internal combustion engine incorporating my invention, with parts broken away and in section.

Referring now to the drawings in detail, Figure 1 shows a multi-cylinder internal combustion engine of the in-line type having a casing or cylinder block 2 extending longitudinally of the engine and journaling the crankshaft 4 to which is coupled the usual external engine cooling fan 6 at the front end of the engine by a fan belt 8. The cylinder block 2 forms a crankcase 10 in which is provided bearings 12 for the crankshaft 4 and bearings 14 for the usual camshaft 16 also extending longitudinally of the engine. Supporting the front and rear crankshaft and camshaft bearings 12 and 14 are the front and rear walls 18 and 20 respectively of the crankcase and these walls 18 and 20 join at each side of the engine with the side walls (not shown) of the crankcase. Forming the top wall of the crankcase is a wall 22 and extending above this wall 22 is an extension 24 of the crankcase front wall 18 and an extension 26 of the crankcase rear wall 20. The side walls of the crankcase similarly extend above the wall 22 and form a valve compartment 28 directly above the crankcase. Reinforcing the cylinder block and supporting the intermediate bearings for the crankshaft and camshaft are walls 30 which depend from the wall 22. The rear wall 20 and its extension 26 serve to close the rear end of both the crankcase and the valve compartment and, whereas the front wall extension 24 similarly closes the front end of the valve compartment 28, the front end of the crankcase is open below the wall 18 to the timing gear compartment 32 formed between the walls 18 and 24 and usual cover 34 enclosing the timing gears (not shown) interconnecting the crankshaft and camshaft. The bottom of the crankcase is closed by the usual oil pan 36, and the top of the valve compartment 28 is closed by a cover designated generally at 38 having spaced apart inner and outer walls 40 and 42 respectively, forming between them a ventilating air jacket or passage 44. Bolts 46 are shown passing through aligned openings in the jacket walls 40 and 42 for anchoring the valve compartment cover in place on the cylinder block.

Figure 2:
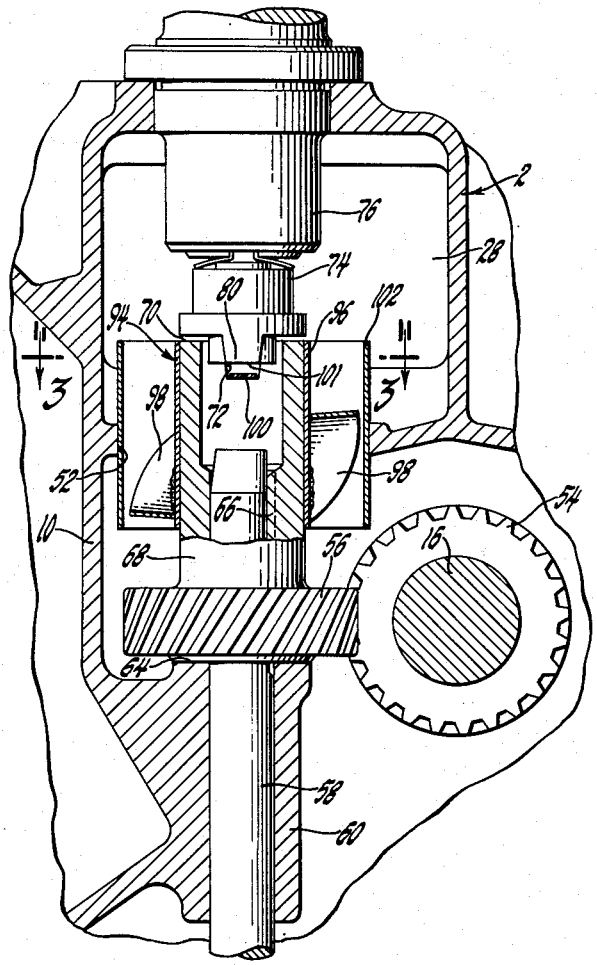
Figure 2 is an enlarged sectional view substantially on line 2—2 of Figure 1.

In accordance with conventional practice the engine ignition distributor 48 and the engine oil pump (not shown), which is located in the sump 50 of the oil pan 36, have a common drive means geared to the camshaft 16. Preferably this drive means is located adjacent one extreme end of the engine for reasons which will be hereinafter apparent and extends through an opening 52 provided in the common wall 22 between the crankcase 10 and the valve compartment 28. A distributor drive gear 54 on the camshaft 16 meshes with a distributor driven gear 56 which is rotatably supported on the oil pump drive shaft 58 journaled in upper and lower brackets 60 and 62 anchored to the cylinder block 2. The distributor driven gear 56 rotatably bears on the upper face 64 of the upper bracket 60 and may be secured to the oil pump shaft 58 in any desired manner as by the key 66 (Figure 2). The distributor driven gear 56 has an upwardly extending hollow hub or shaft portion 68 which terminates in an end face 70 having a transverse groove or slot 72. Extending into the upper end of the hollow shaft portion 68 is the lower end of the distributor shaft 74. The shaft 74 is journaled in the stationary distributor shaft housing 76 which extends through the cylinder block and clamped in place thereon by a suitable crab 78. The lower end of the distributor shaft 74 has an integrally associated spline or tongue portion 80 which is received in and is interengaged by the groove 72 on the distributor driven shaft 68. The opening 52 is substantially larger than the periphery of the shaft 68 and the clearance therebetween provides communication between the crankcase 10 and the valve compartment 28.

Secured to the cylinder block 2 opposite an opening 82 therein at the top of the timing gear compartment 32 is an engine oil filler pipe 84 which also serves as a ventilating inlet duct. The upper end of this pipe 84 may be provided with the usual cap 86 which has a depending skirt portion 88 fitting loosely about the pipe and apertured at 90 to permit air being drawn into the upper end of the pipe. A ventilating outlet duct or pipe 92 is connected to an opening through the upper wall 42 of the valve gear compartment cover 38 adjacent the rear end of the engine; and this pipe leads downwardly to a point adjacent the bottom of the crankcase where it is exposed to the suction effect of the vehicle slip stream. There is thus provided a ventilating circuit through the engine. Air entering the oil filler pipe past the cap 86 passes in the direction of the arrows in Figure 1 downwardly through the timing gear compartment 32, around the bottom of the front wall 10 of the crankcase, thence rearwardly through the crankcase to the rear end of the engine, thence upwardly through the opening 52 in the wall 22, thence forwardly of the engine through the valve gear compartment 28 to the opening 43, and then rearwardly again through the jacket 44 and out through the pipe 92.

Figure 3:
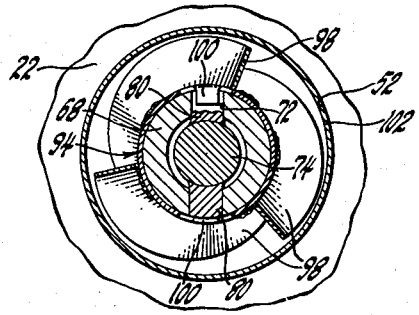
Figure 3 is a detail sectional view substantially on line 3—3 of Figure 2.
Figure 4:
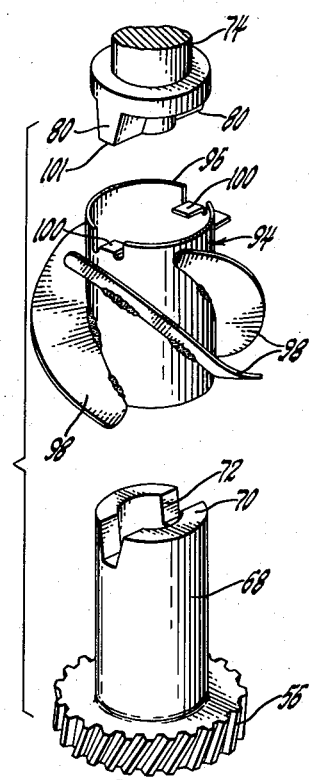
Figure 4 is an exploded view in perspective of my fan and the tongued and grooved ends of the distributor drive shafts between which the fan is mounted in the engine.

In order that the circulation of air through the engine may be made positive at all engine speeds I provide a fan 94 which is supported by and rotates with the distributor driving means in the opening 52. As best shown in Figures 2-4, this fan may be cheaply and simply formed from sheet metal to provide a cylindrical core 96 open at both ends and of a diameter which will have a slidable fit about the hub 68 of the distributor driven gear. Secured as by welding or any suitable means on the outer periphery of the core 96 are a plurality of helical blades 98 which project radially outward toward the walls of the opening 52. As means to insure rotation of the fan during engine operation the upper end of the core 96 is provided with radially inwardly extending tab-like lugs 100, lanced out of the sheet metal core, and disposed in the opposite ends of the transverse groove 72. As shown in Figure 2, these lugs 100 rest on the bottom of the groove 72 and are retained in place therein by the lower end faces 101 of the tongue portion 80 on the end of the distributor shaft 74. Thus the fan is made to rotate with the distributor driven gear shaft 68 and distributor shaft 74 and is also suitably located axially of the opening 52. To increase the fan efficiency I also provide a sheet metal shroud 102 made of sheet metal which is press fitted or otherwise suitably secured in the opening 52. During engine operation a positive flow of air from the crankcase to the valve gear compartment is thus induced.

While I have illustrated my fan as mounted on the distributor drive shaft of an internal combustion engine, it will be obvious to those skilled in the art that the same may be applied to other shafts having a tongue and groove driving connection between them and where it is desired to effect an axial flow of air therealong. Further, while I have described my invention in detail in its present preferred embodiment, various changes and modifications may, of course, be made therein without departing from the spirit and scope of the appended claims.

I claim:

1. In a ventilation system for an internal combustion engine, a cylinder block having a crankcase and a valve compartment separated by a common wall, said wall having an opening providing communication between the crankcase and valve compartment, drive means extending through said opening including rotary driving and driven members in end to end relation, interengaging tongue and slot portions rotatably keyed to said members between said tongue and slot portions.

2. In a ventilating system for an engine, an engine casing having a wall provided with an opening, a rotatively driven first member extending through said opening, a second member longitudinally adjacent said first member and rotatable therewith, positively interengaged rotary driving faces on the adjacent ends of said members, and an impeller coaxially rotatable with one of said members and having a driving lug disposed between said interengaged faces.

3. In an internal combustion engine, a cylinder block forming a crankcase and a valve compartment interconnected by an opening, said crankcase having a ventilating inlet and said valve compartment having a ventilating outlet, an engine ignition distributor having a rotary driving means extending through said opening, and a ventilating fan rotatable in said opening with said driving means.

4. In an internal combustion engine having a cylinder block forming a crankcase and a valve compartment with a separating wall therebetween having an opening through which gas may flow between the crankcase and the valve compartment, a camshaft journaled in the block on the crankcase side of said wall, a distributor drive shaft geared to the camshaft and extending coaxially into said opening, a transversely extending groove in the extended end of said drive shaft, an axial flow ventilating fan rotatable in said opening with said drive shaft, said fan having a cylindrical sheet metal core supporting a series of outwardly radiating helical blades, one end of said core having a lanced-out radially inward extending lug seated in said groove, a distributor shaft extending into the valve compartment and having a driving tongue on its inner end received in said groove, and a cylindrical sheet metal shroud circumferentially enclosing said blades and secured to the casing within said opening.

5. In an internal combustion engine having a crankcase and a valve compartment separated by a common wall extending longitudinally of the engine, a camshaft supported in opposite ends of the crankcase, a camshaft driving gear compartment at one end of the engine, an imperforate wall at said one end of the engine between the valve and gear compartments and extending into the crankcase, said gear compartment and crankcase being in communication opposite the extended end of said imperforate wall, a ventilating inlet duct connected to the gear compartment opposite the valve compartment, said common wall having an opening adjacent the other end of the engine providing communication between the crankcase and valve compartment, camshaft driven means rotated about an axis extending through said opening, said driven means including axially adjacent shaft members having a tongue and groove on their adjacent ends forming a rotary driving connection therebetween, an axial flow fan in said opening rotatable on said axis, said fan having integrally associated radially extending lugs engaged in said groove and securing said fan for rotation with said shaft members, a cover for the valve compartment having spaced apart inner and outer walls forming a jacket extending longitudinally of the engine with an opening to the valve compartment at said one end of the engine, and a ventilating outlet duct connected to said jacket at said other end of the engine.

6. The combination with a rotatively driven shaft and a generally coaxial and longitudinally adjacent driving shaft therefor the adjacent ends of which shafts have a spline and a spline receiving groove respectively for effecting a rotary driving connection therebetween, of an impeller rotatable with said shafts having a generally radially projecting lug disposed inwardly of said spline within said groove.

7. In combination, axially adjacent aligned driving and driven shafts provided on their adjacent ends with a tongue and a tongue receiving groove in rotatively interlocked relation, and a rotary impeller having a core embracing one of said shafts with an inwardly projecting lug disposed between said shafts and retained in said groove by said tongue.

8. In a ventilation system for an engine or the like having crankcase and valve compartments with a partition therebetween, said partition having an opening, an engine driven shaft of smaller cross section than said opening and extending therethrough, and an axial flow fan secured to said shaft within opening for delivering air from one compartment to the other.

9. In a ventilating system for an engine or the like having two enclosed compartments separated by a partition, engine driven means extending through said partition, said partition having an opening surrounding said means accommodating passage of air from one compartment to the other, and an axial flow fan carried by said means within said opening.

ROBERT T. DOUGHTY.

References Cited in the file of this patent

UNITED STATES PATENTS

| Number | Name | Date |
|---|---|---|
| 1,329,587 | Dunham | Feb. 3, 1920 |
| 1,345,048 | Weidely | June 29, 1920 |
| 1,872,609 | Schittke | Aug. 16, 1932 |
| 2,029,216 | Barker | Jan. 28, 1936 |
| 2,252,974 | Lowther | Aug. 19, 1941 |
| 2,389,140 | Enblom | Nov. 20, 1945 |

FOREIGN PATENTS

| Number | Country | Date |
|---|---|---|
| 318,682 | Germany | Feb. 5, 1920 |